United States Patent
Adkins et al.

(10) Patent No.: US 11,312,811 B2
(45) Date of Patent: Apr. 26, 2022

(54) FLEXIBLE FOAM USING POLYMER POLYOLS PRODUCED VIA DMC CATALYZED POLYOLS

(71) Applicant: Covestro LLC, Pittsburgh, PA (US)

(72) Inventors: Rick L. Adkins, Canonsburg, PA (US); Brian L. Neal, Pittsburgh, PA (US); Peter Uthe, Hickory, NC (US); Jack R. Reese, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 15/138,939

(22) Filed: Apr. 26, 2016

(65) Prior Publication Data

US 2017/0306076 A1    Oct. 26, 2017

(51) Int. Cl.

| C08G 18/40 | (2006.01) |
|---|---|
| C08F 220/44 | (2006.01) |
| C08G 18/63 | (2006.01) |
| C08G 18/32 | (2006.01) |
| C08G 18/48 | (2006.01) |
| C08G 18/81 | (2006.01) |
| C08G 18/66 | (2006.01) |
| C08F 283/06 | (2006.01) |
| C08G 18/08 | (2006.01) |
| C08G 18/76 | (2006.01) |
| C08G 65/12 | (2006.01) |

(52) U.S. Cl.
CPC ........ *C08G 18/4072* (2013.01); *C08F 220/44* (2013.01); *C08F 283/06* (2013.01); *C08G 18/14* (2013.01); *C08G 18/3275* (2013.01); *C08G 18/4816* (2013.01); *C08G 18/4833* (2013.01); *C08G 18/4837* (2013.01); *C08G 18/4866* (2013.01); *C08G 18/632* (2013.01); *C08G 18/636* (2013.01); *C08G 18/6688* (2013.01); *C08G 18/7621* (2013.01); *C08G 18/8108* (2013.01); *C08G 65/12* (2013.01); C08G 2110/0008 (2021.01); C08G 2110/0016 (2021.01); C08G 2110/0083 (2021.01); C08G 2650/58 (2013.01)

(58) Field of Classification Search
CPC ... C08F 283/06; C08G 18/14; C08G 18/4072; C08G 18/7621; C08G 65/12; C08G 2101/0008; C08G 2101/0083; C08G 2650/58

See application file for complete search history.

(56) References Cited

U.S. PATENT DOCUMENTS

| 5,011,908 | A |  | 4/1991 | Hager |
|---|---|---|---|---|
| 5,059,641 | A |  | 10/1991 | Hayes et al. |
| 5,268,418 | A | * | 12/1993 | Simroth ............... C08F 283/06 524/765 |
| 5,482,908 | A |  | 1/1996 | Le-Khac |
| 5,605,939 | A |  | 2/1997 | Hager |
| 5,688,861 | A |  | 11/1997 | Simroth et al. |
| 5,955,534 | A |  | 9/1999 | Simroth et al. |
| 6,066,683 | A |  | 5/2000 | Beisner et al. |
| 6,143,802 | A |  | 11/2000 | Simroth et al. |
| 6,172,164 | B1 |  | 1/2001 | Davis et al. |
| 7,179,882 | B2 |  | 2/2007 | Adkins et al. |
| 7,759,423 | B2 |  | 7/2010 | Chauk |
| 8,383,733 | B2 |  | 2/2013 | Adkins et al. |
| 8,598,248 | B2 |  | 12/2013 | Hager et al. |
| 8,835,565 | B2 |  | 9/2014 | England et al. |
| 8,877,863 | B2 |  | 11/2014 | Pazos et al. |
| 8,987,396 | B2 |  | 3/2015 | Adkins et al. |
| 2004/0220290 | A1 |  | 11/2004 | Grimm et al. |
| 2005/0101681 | A1 |  | 5/2005 | Kaushiva et al. |
| 2006/0025492 | A1 |  | 2/2006 | Chauk |
| 2007/0060690 | A1 |  | 3/2007 | Adkins et al. |
| 2010/0160469 | A1 |  | 6/2010 | Adkins et al. |
| 2011/0086996 | A1 |  | 4/2011 | Nakada et al. |
| 2011/0306728 | A1 |  | 12/2011 | Adkins et al. |
| 2013/0059936 | A1 |  | 3/2013 | Sasaki et al. |
| 2014/0066536 | A1 |  | 3/2014 | Adkins et al. |
| 2014/0275471 | A1 |  | 9/2014 | Adkins et al. |
| 2016/0333129 | A1 |  | 11/2016 | Hofmann et al. |

FOREIGN PATENT DOCUMENTS

JP          06-228247        8/1994

* cited by examiner

*Primary Examiner* — John M Cooney
(74) *Attorney, Agent, or Firm* — Donald R. Palladino; N. Denise Brown

(57) ABSTRACT

This invention relates to improved flexible foams prepared from polymer polyols and to a process for preparing these improved flexible foams.

16 Claims, No Drawings

FLEXIBLE FOAM USING POLYMER POLYOLS PRODUCED VIA DMC CATALYZED POLYOLS

BACKGROUND OF THE INVENTION

This invention relates to a process for producing flexible foam and to the flexible foam produced by this process.

Polymer polyols are known to be useful in preparing polyurethane foams, including flexible foams. The general trend in foam properties of polyurethane foams which are prepared from high solids content (i.e. at least 30% by weight solids) SAN polymer polyols is that the solids efficiency (i.e. the foam hardness per unit of SAN solids) decreases as the percent by weight of solids in the polymer polyol increases.

It has been surprisingly found that the flexible foams exhibiting improved foam stability can be prepared from polymer polyols wherein the base polyol is prepared with a DMC catalyst in comparison to the properties of flexible foams prepared from conventional polymer polyols wherein the base polyol is prepared with a basic catalyst such as KOH.

SUMMARY OF THE INVENTION

This invention relates to a process for producing a flexible foam. This process comprises reacting
(I) at least one diisocyanate or polyisocyanate component, with
(II) an isocyanate-reactive component comprising
  (A) at least polyether polyol having a functionality of from about 2 to about 6 and a molecular weight of from about 700 to about 14,000;
  (B) at least one polymer polyol having a solids content of greater than about 20% by weight, a total ethylene oxide content of up to about 25% by weight, having a viscosity at 25° C. of about 15,000 mPa·s or less, and comprising a reaction product of
    (1) at least one base polyol containing active hydrogen atoms having a molecular weight of about 14,000 or less, and a total ethylene oxide content up to about 40% by weight, said base polyol being formed in the presence of a DMC catalyst,
    (2) at least one unsaturated monomer,
    and,
    (3) a preformed stabilizer,
    in the presence of;
    (4) at least one free radical initiator that comprises a peroxide,
    and optionally
    (5) a chain transfer agent;
  and
  (C) one or more chain extenders and/or crosslinking agents having a functionality of from about 2 to about 3, and a molecular weight of about 300 of less;
  in the presence of
(III) one or more blowing agents, and, optionally,
(IV) one or more additives and/or auxiliary agents;
at an Isocyanate Index of from about 90 to about 120.

The present invention also relates to flexible foams. These foams comprise the reaction product of:
(I) at least one diisocyanate or polyisocyanate component, with
(II) an isocyanate-reactive component comprising
  (A) at least polyether polyol having a functionality of from about 2 to about 6 and a molecular weight of from about 700 to about 14,000;
  (B) at least one polymer polyol having a solids content of greater than about 20% by weight, a total ethylene oxide content of up to about 25% by weight, having a viscosity at 25° C. of about 15,000 mPa·s or less, and comprising a reaction product of
    (1) at least one base polyol containing active hydrogen atoms having a molecular weight of about 14,000 or less, and a total ethylene oxide content up to about 40% by weight, said base polyol being formed in the presence of a DMC catalyst,
    (2) at least one unsaturated monomer,
    and,
    (3) a preformed stabilizer,
    in the presence of;
    (4) at least one free radical initiator that comprises a peroxide,
    and optionally
    (5) a chain transfer agent;
  and
  (C) one or more chain extenders and/or crosslinking agents having a functionality of from about 2 to about 3, and a molecular weight of about 300 or less; in the presence of
(III) one or more blowing agents, (preferably water) and, optionally,
(IV) one or more additives and/or auxiliary agents (preferably at least one surfactant and at least one catalyst) at an Isocyanate Index of from about 90 to about 120.

DETAILED DESCRIPTION OF THE INVENTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provides an isocyanate index of 100%.

As used herein, the following terms shall have the following meanings.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), with at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein "viscosity" is in millipascal-seconds (mPa.$) measured at 25° C.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the number average molecular weight of the polyol.

The flexible foams of the invention comprise the reaction product of (I) a diisocyanate or a polyisocyanate, with (II) an isocyanate-reactive component comprising (A) at least one polyether polyol, (B) at least one polymer polyol as described herein, and (C) one or more chain extenders and/or crosslinking agents, in the presence of (III) at least one blowing agent and, optionally, (IV) one or more other additives and/or auxiliary agents. Other suitable additives and auxiliary agents which may be present include catalysts, surfactants, antioxidants, dyes, pigments, flame retardants, liquid and solid fillers, and other known commercial additives known to be useful in preparing flexible foams.

The process of preparing the flexible foams comprises reacting (I) a diisocyanate or a polyisocyanate component, with (II) an isocyanate-reactive component comprising (A) at least one polyether polyol, (B) at least one polymer polyol as described herein, and (C) one or more chain extenders and/or crosslinking agents, in the presence of (III) a blowing agent and, optionally, (IV) one or more other additives and/or auxiliary agents. Other additives and auxiliary agents which may be present include catalysts, surfactants, antioxidants, dyes, pigments, flame retardants, liquid and solid fillers, and other known commercial additives and auxiliary agents which are known to be useful in preparing flexible foams.

The foams and process of producing the foams of the present invention may have an Isocyanate Index in the range of from about 90 to about 120. The Isocyanate Index may at least about 90, or at least about 95. The Isocyanate Index may also be about 120 or less, or about 115 or less. Suitable isocyanate Indices may range between any combination of these upper and lower ranges, inclusive, such as from at least about 90 to about 120 or less, or from at least about 95 to about 115 or less.

Suitable diisocyanates and polyisocyanates for use as component (I) in the invention contain two or more free NCO groups per molecule and are those conventionally used to make flexible polyurethane foam. Useful polyisocyanates include aromatic, aliphatic, and cycloaliphatic di- and polyisocyanates. Such isocyanates are well known in the art. Suitable organic polyisocyanates include the hydrocarbon diisocyanates (e.g., the alkylene diisocyanates and the aryl diisocyanates, as well as known triisocyanates and polymethylene poly(phenylene isocyanates). Examples of suitable polyisocyanates are 2,4-diisocyanatotoluene, 2,6-diisocyanatotoluene, methylene bis(4-cyclohexylisocyanate), 1,8-diisocyanatooctane, 1,5-diisocyanato-2,2,4-trimethylpentane, 1,9-diisocyanatononane, 1,10-diisocyanatopropylether of 1,4-butylene glycol, 1,11-diisocyanatoundecane, 1,12-diisocyanatododecane bis(isocyanatohexyl) sulfide, 1,4-d iisocyanatobenzene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanate-1-nitrobenzene, 4,4'-diphenylmethylene diisocyanate, 2,4'-diphenylmethylene diisocyanate, and polymethylene poly(phenyleneisocyanates), and mixtures thereof. Also suitable examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof.

In one embodiment, the polyisocyanate comprises toluene diisocyanate (i.e. TDI, usually a mixture of 2,4- and 2,6-isomers), diphenylmethane diisocyanate (i.e. MDI, including 2,4'-MDI, 2,2'-MDI, 4,4'-MDI and mixtures thereof), and mixtures of these. In another embodiment, the diphenylmethane diisocyanates may have a monomeric MDI content of at least about 50% by weight, or of at least about 60% by weight.

The amount of polyisocyanate used is normally adjusted to arrive at a desired isocyanate index. Generally, the amount of polyisocyanate used will be within the range of about 20 to about 50 wt. %. The amount of polyisocyanate may be at least about 20% by weight, or at least about 25% by weight. The amount of polyisocyanate may also be about 50% by weight or less, or about 40% by weight or less, based on the combined weight of the isocyanate-reactive mixture and polyisocyanate. Suitable amounts of polyisocyanate may range between any combination of these upper and lower values, inclusive, such as, from at least about 20% to about 50% or less, or from at least about 25 to about 40% by weight or less, based on the combined weights of the isocyanate-reactive mixture and polyisocyanate.

An advantage of the invention is the ability to formulate viscoelastic foams over a wide range of water levels and isocyanate indices. In particular, exceptionally high indices (compared with commercial viscoelastic foam) can be used. As described above, the NCO index will generally be within the range of about 90 to about 120, or from about 95 to about 110.

In accordance with the present invention, the isocyanate-reactive component (II) typically comprises (A) at least one polyether polyol having a functionality of from about 2 to about 6 and a molecular weight of from about 700 to about 14,000. Suitable polyether polyols may have a functionality of at least two, or of at least 3. These polyether polyols may also have a functionality of no more than 6, or of no more than 5. In addition, suitable polyether polyols may have functionalities ranging between any combination of these upper and lower values, inclusive, of from about 2 to about 6, or of from 3 to 5. The molecular weight of these polyether polyols is typically at least about 700, or at least about 1000, or at least about 2000. These polyether polyols also typically have molecular weights of no more than about 14,000, or no more than about 12,000 or no more than about 8000. These polyether polyols may have molecular weights ranging between any combination of these upper and lower values, inclusive, such as from about 700 to about 14,000, or from about 1000 to about 12000, or from about 2000 to about 8000.

Examples of such compounds include polyoxyethylene glycols, triols, tetrols and higher functionality polyols, polyoxypropylene glycols, triols, tetrols and higher functionality polyols, mixtures thereof, etc. When mixtures are used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylene diamine, toluene diamine, etc. and mixtures thereof. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the polyether polyol (A) of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctane, 1,10-dihydroxydecane, glycerol, 1,2, 4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxyphenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable polymer polyols for component (B) herein include those having a solids content of greater than about 20% by weight, a total ethylene oxide content of up to about 25% by weight, an ethylene oxide content of up to about 40% by weight in the base polyol, and a viscosity at 25° C. of less than about 15,000 mPa·s. These polymer polyols comprise the reaction product of (1) at least one base polyol containing active hydrogen atoms having a molecular weight of less than about 14,000 and a total ethylene oxide content of up to about 40% by weight, wherein the base polyol is prepared in the presence of a DMC catalyst, (2) at least one unsaturated monomer, and (3) a preformed stabilizer, formed in the presence of (4) at least one free radical initiator that comprises a peroxide, and optionally, (5) a chain transfer agent.

The polymer polyols (B) of the present invention are characterized by a solids content of greater than about 20% by weight. The solids content of the suitable polymer polyols for the invention is typically at least about 20%, or at least about 30% or at least about 40% by weight. The solids content of the suitable polymer polyols is also typically less than or equal to about 65%, or less than or equal to about 60% or less than or equal to about 55% by weight. The polymer polyols herein may have a solids contents ranging between any combination of these upper and lower values, inclusive, such as from about 20 to about 65%, or from about 30 to about 60%, or from about 40 to about 55% by weight. These polymer polyols also have a total ethylene oxide content of up to about 25% by weight, or up to about 23% by weight, or up to about 20% by weight, or up to about 15% by weight. The total ethylene oxide content of the polymer polyols may be at least about 1%, or at least about 2%, or at least about 3%, or at least about 5% by weight. The polymer polyols may have a total ethylene oxide content ranging between any combination of these upper and lower values, inclusive, such as, from about 1 to about 25% by weight, or from about 2 to about 23% by weight, or from about 3 to about 20% by weight, or from about 5 to about 15% by weight. These polymer polyols have an ethylene oxide content of up to about 40% by weight in the base polyol. The ethylene oxide content in the base polyol of the polymer polyols may be up to about 40%, or up to about 35%, or up to about 25% or up to about 20% by weight. The ethylene oxide content in the base polyol of the polymer polyols may also be at least about 1%, or at least about 2%, or at least about 5% or at least about 8% by weight. The base polyols of the polymer polyols may have ethylene oxide contents ranging between any combination of these upper and lower values, inclusive, such as from about 1 to about 40% by weight, or from about 2 to about 35% by weight, or from about 5 to about 25% by weight, or from about 8 to about 20% by weight. Finally, the polymer polyols of the invention are characterized by a viscosity at 25° C. of less than about 15,000 mPa·s, or of less than about 13,000 mPa·s, or of less than about 11,000 mPa·s, or of less than about 8,000 mPa·s.

These polymer polyols (B) may have a minimum solids content of greater than about 20% by weight. The polymer polyols (B) may also have a maximum solids content of about 65% by weight or less. The minimum solids content of the polymer polyols (B) may be at least about 20%, or at least about 25%, or at least about 30%, or at least greater than about 35%, or at least greater than about 40% by weight. They may also have a maximum solids content of no more than 65%, or of not more than 62%, or of no more than 60%, or of no more than 58%, or of no more than 55% by weight. The polymer polyols (B) of the invention may have a solids content ranging between any combination of these upper and lower values, inclusive, e.g. from at least about 20% to about 65%, from at least about 25% to about 62%, from at least about 30 to about 58% or from at least about 35% to about 55% by weight.

Polymer polyols (B) of the invention are typically characterized by a viscosity (at 25° C.) of less than about 15,000 mPa·s, or of less than about 13,000, or of less than about 11,000, or of less than about 10,000 or of less than about 8,000 mPa·s.

Suitable polyols to be used as (1) the base polyol in the polymer polyol component (B) of the invention include, for example, polyether polyols. Suitable polyether polyols include those which have functionality of at least about 2, or of at least about 3. The functionality of suitable polyether polyols is less than or equal to about 8, or less than or equal to about 6. The suitable polyether polyols may also have functionalities ranging between any combination of these upper and lower values, inclusive, such as from about 2 to about 8, or of from about 3 to about 6. The OH numbers of suitable polyether polyols is at least about 8, or at least about 20, or at least about 30. Suitable polyether polyols typically also have OH numbers of less than or equal to about 640, or less than or equal to about 400, or less than or equal to about 200. The suitable polyether polyols may also have OH numbers ranging between any combination of these upper and lower values, inclusive, such as, for example, from at least about 8 to less than or equal to about 640, or from at least about 20 to less than or equal to about 400, or from at least about 30 to less than or equal to about 200. The molecular weight of the suitable polyether polyols for the base polyol is less than 14,000. The molecular weight of these polyether polyols may also be at least about 700, or at least about 1000, or at least about 2000. Suitable polyether polyols also have molecular weights of less than 14,000, or less than or equal to about 12,000, or less than or equal to about 10,000. The suitable polyether polyols may also have molecular weights ranging between any combination of these upper and lower values, inclusive, such as, for example, from at least about 700 to less than or equal to about 14,000, or from at least about 1000 to less than or equal to about 12,000, or from at least about 2000 to less than or equal to about 10,000.

The base polyols suitable herein have a total ethylene oxide content of up to about 40% by weight, or of up to about 35%, or of up to about 30% or of up to about 25% by weight. The base polyols may also be characterized as having a total ethylene oxide content of at least about 1% by weight, or of at least about 2% by weight, or of at least about 5% by weight or of at least about 8% by weight. Thus, suitable base polyols may have an ethylene oxide content ranging between any combination of these upper and lower values, inclusive, such as, for example, or from at least about 1 to less than or equal to about 40% by weight, or from at least about 2 to less than or equal to about 35% by weight, or from at least about 5 to less than or equal to about 30% by weight, or from at least about 8 to less than or equal to about 25% by weight.

Examples of such compounds for the base polyol (1) of the polymer polyol component (B) include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylene diamine, toluene diamine, etc. By alkoxylation of the starter, a suitable polyether polyol for the base polyol component can be formed. The alkoxylation reaction may be catalyzed using a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxyphenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

It should also be appreciated that blends or mixtures of various useful base polyols may be used in the present invention if desired.

The suitable polyols to be used as (1) the base polyol in the polymer polyol component (B) of the invention can be made by using reaction techniques for DMC catalyzed polyether polyols that are known to those skilled in the art. These include a conventional semi-batch process wherein a low molecular starter or starters made via DMC or KOH technology (with the KOH removed) are added to the reactor, the DMC catalyst is added to the reactor and the alkylene oxide necessary to give the target molecular weight is continuously added over 2 or more hours. A second semi-batch process is a continuous addition of starter approach as described in U.S. Pat. No. 5,777,177, the disclosure of which is incorporated herein. Another method to make the DMC catalyzed polyethers of the present invention is to use a continuous process as described in U.S. Pat. No. 5,689,012, the disclosure of which is incorporated herein.

Suitable compounds to be used as the (2) one or more unsaturated monomer of the present invention include, for example, those ethylenically unsaturated monomers such as, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)-acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

In some embodiments of the invention, a combination of styrene and acrylonitrile are used as ethylenically unsaturated monomers. This combination of monomers may be used in amounts such that the weight ratio of styrene to acrylonitrile (S:AN) ranges from about 80:20 to about 20:80. Suitable weight ratios of styrene to acrylonitrile may be from about 80:20, or from about 75:25, or from about 70:30. Suitable weight ratios of styrene to acrylonitrile may also be from about 20:80 or from about 25:75 or from about 30:70. The weight ratios of styrene to acrylonitrile suitable for the invention may range from any combination of these upper and lower weight ratios, inclusive, such as from about 80:20 to about 20:80, or from about 75:25 to 25:75, or from about 70:30 to 30:70. These ratios are suitable for polymer polyols and the processes of preparing them in accordance with the present invention.

Suitable preformed stabilizers to be used as component (3) in the present invention are preformed stabilizers which are known to be suitable for polymer polyols. One suitable group of preformed stabilizers comprise the reaction product of:
(a) a macromer that contains reactive unsaturation;
with
(b) one or more ethylenically unsaturated monomers;
and
(c) at least one free radical initiator;
in the presence of
(d) at least one polymer control agent;
and, optionally,
(e) a diluent.

Suitable macromers herein contain reactive unsaturation. These macromers comprise the reaction product of: (i) a starter compound having a functionality of 2 to 8, and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 30% by weight, based on 100% by weight of the sum of components (i), (ii) and (iii), of a diisocyanate.

As described in, for example, U.S. Pat. No. 5,196,476, the disclosure of which is herein incorporated by reference, suitable preformed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and recovering a mixture containing the preformed stabilizer dispersed in the polymer control agent.

Suitable starter compounds to be used as (i) in the macromer (a) containing reactive unsaturation, include compounds having a hydroxyl functionality of from 2 to 8; and have a hydroxyl number of from 20 to 50. Suitable starter compounds may have a hydroxyl functionality of at least about 2, or at least about 3. They may also have a hydroxyl functionality of about 8 or less, or about 6 or less. Suitable starter compounds for component (i) in the macromer may have a hydroxyl functionality ranging between any combination of these upper and lower values, inclusive, such as from at least about 2 to about 8 or less, or from at least about 3 to about 6 or less. These starter compounds are also characterized as having a hydroxyl number of at least about 20, or of at least about 35. Starter compounds for component (i) of the macromer may also have a hydroxyl number of about 50 or less, or of about 40 or less. The starter compounds for component (i) of the macromer may have a hydroxyl number that ranges between any combination of these upper and lower values, inclusive, such as from about 20 to about 50 or less, or from about 25 to about 40 or less.

Examples of such starter compounds include alkylene oxide adducts of hydroxyl functional compounds such as ethylene glycol, propylene glycol, diethylene glycol, dipropylene glycol, tripropylene glycol, glycerin, trimethylolpropane, pentaerythritol, sorbitol, ethylene diamine, toluene diamine, etc. These alkylene oxide adducts may comprise propylene oxide, ethylene oxide, butylene oxide, styrene oxide, and mixtures thereof. It is possible for these starter compounds comprise 100% of an alkylene oxide such as, for example, propylene oxide, or a mixture of propylene oxide and a second alkylene oxide such as ethylene oxide or butylene oxide. When a mixture of alkylene oxides are used to form the starter compounds (i), mixtures of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possible to use a combination of simultaneous and sequential addition of alkylene oxides. In one embodiment, an alkylene oxide such as propylene oxide may be added first, and then a second alkylene oxide such as ethylene oxide added as a cap.

Other examples of such compounds for starter (i) in the macromer (a) include polyoxyethylene glycols, triols, tetrols and higher functionality polyols, and mixtures thereof, etc. When mixtures are used, the ethylene oxide and propylene oxide may be added simultaneously or sequentially to provide internal blocks, terminal blocks or random distribution of the oxyethylene groups and/or oxypropylene groups in the polyether polyol.

By alkoxylation of the starter (i), a suitable compound for the starter of the macromer (a) can be formed. The alkoxylation reaction may be catalyzed using any conventional catalyst including, for example, potassium hydroxide (KOH) or a double metal cyanide (DMC) catalyst.

Other suitable polyols for the starter (i) of the macromer (a) in the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxyphenyl)propanes, condensation products of various phenolic compounds and glyoxal, glutaraldehyde, other dialdehydes, including the 1,1,2,2-tetrakis (hydroxyphenol)ethanes, etc.

In one embodiment, the starter compound (i) has a functionality of from 3 to 6 and a hydroxyl number of from 25 to 40, and is prepared by reacting a starter such as glycerin, trimethylolpropane, pentaerythritol, dipentaerythritol, sorbitol, mannitol, etc., with alkylene oxides comprising at least one alkylene oxide such as, for example, propylene oxide and/or ethylene oxide.

In another embodiment, the ethylene oxide of starter compound (i) comprises from at least about 1%, or from at least about 5%, or from at least about 10% by weight, based on the total weight of the starter compound. The ethylene oxide also comprises less than or equal to about 40% by weight, or less than or equal to about 30%, or less than or about equal to about 25% by weight, based on the total weight of the starter compound. The ethylene oxide content may range between any combination of these upper and lower values, inclusive, of from at least about 1% to less than or equal to about 40% by weight, or from at least about 5% to less than or equal to about 30%, or from at least about 10% to less than or equal to about 25% by weight, based on the total weight of the starter compound.

In an alternate embodiment, all or a portion of the ethylene oxide is added as a cap on the end of the starter compound. Suitable amounts of ethylene oxide to be added as a cap can be at least about 1%, or at least about 3% or at least about 5% by weight. Suitable amounts of ethylene oxide which can be added as a cap can be less than or equal to about 40%, or less than or equal to about 30%, or less than or equal to about 25% by weight. Suitable amounts of ethylene oxide which can be added as cap can range between any combination of these upper and lower values, inclusive, from at least about 1% to less than or equal to about 40%, or from at least about 3% to less than or equal to about 30%, or from at least about 5% to less than or equal to about 25% by weight (based on 100% by weight of the starter compound).

Suitable compounds to be used as component (a)(ii) the hydroxyl-reactive compound that contains reactive unsaturation include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

In one embodiment, the macromer (a) may additionally comprise (iii) a diisocyanate component. The diisocyanate component may be present in an amount of from 0, or from at least about 0.05, or from at least about 0.1% by weight, based on 100% by weight of the sum of components (i), (ii) and (iii). The diisocyanate component may also be present in an amount of less than or equal to about 3% by weight, or of less than or equal to about 2.5% by weight, or of less than or equal to about 1.5% by weight, based on 100% by weight of the sum of components (i), (ii) and (iii). The amount of diisocyanate may range between any combination of these upper and lower values, inclusive, or from 0% to less than or equal to about 3% by weight, of from at least about 0.05 to less than or equal to about 2.5% by weight, or from at least about 0.1 to less than or equal to about 1.5% by weight, based on 100% by weight of the sum of components (i), (ii) and (iii), of a diisocyanate component. Suitable diisocyanates include various isomers of diphenylmethane diisocyanate and isomeric mixtures of diphenylmethane diisocyanate such as, for example a mixture of 2,4'-diphenylmethane diisocyanate, 4,4'-diphenylmethane diisocyanate and/or 2,2'-diphenylmethane diisocyanate. In one embodiment, a mixture of 2,4'-diphenylmethane diisocyanate and of 4,4'-diphenylmethane diisocyanate is suitable. Other suitable isocyanates include toluenediisocyanate, isophoronediisocyanate, hexamethylenediisocyanate, 4,4'-methylenebis(cyclohexyl isocyanate), etc.

Suitable ethylenically unsaturated monomers to be used as component (b) above of the preformed stabilizer include, for example, compounds which contain ethylenic unsaturation. Of particular relevance are those compounds that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-dimethylaminomethyl)acryl-amide and the like; vinyl esters such as vinyl acetate; vinyl ethers, vinyl ketones, vinyl and vinylidene halides as well as a wide variety of other ethylenically unsaturated materials which are copolymerizable with the aforementioned macromer. It is understood that mixtures of two or more of the aforementioned ethylenically unsaturated monomers are also suitable to be employed in making the pre-formed stabilizer. Of the above monomers, the monovinylidene aromatic monomers such as styrene, and the ethylenically unsaturated nitriles, such as acrylonitrile may be particularly suitable.

It is preferred that (b) comprises a mixture of acrylonitrile and at least one other ethylenically unsaturated comonomer which is copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like. Mixtures of styrene and acrylonitrile may be used.

When using acrylonitrile with a comonomer, it is recommended that a minimum of about 5% by weight of acrylonitrile be maintained in the system. It is also recommended when using acrylonitrile with a comonomer that no more than about 15% by weight acrylonitrile be maintained in the system. Styrene will generally be used as the comonomer, but methyl methacrylate or other monomers may be employed in place of part or all of the styrene. A specific monomer mixture for component (b) in making the preformed stabilizer composition (3) comprises mixtures of acrylonitrile and styrene. The weight proportion of acrylonitrile can be at least about 20%, or from at least about 30% by weight of the comonomer mixture. The weight proportion of acrylonitrile can be less than or equal to about 80%, or less than or equal to about 70% by weight, based on 100% by weight of the comonomer mixture. The weight of the acrylonitrile in the comonomer mixture can vary between any combination of these upper and lower limits, inclusive, of from at least about 20 to less than or equal to about 80% by weight of the comonomer mixture, or from at least about 30 to less than or equal to about 70% by weight of the comonomer mixture. Styrene content can vary accordingly, The styrene content can be at least about 20%, or at least about 30% by weight, The styrene content can also be less than or equal to about 80%, or less than or equal to about 70% by weight, based on 100% by weight of the total mixture. The styrene content can vary between any combination of these upper and lower values, inclusive, such as, for example, of at least about 20% to less than or equal to about 80% by weight, or at least about 30% to less than or equal to about 70% by weight, based on 100% by weight of the mixture. The sum of the styrene content and the acrylonitrile content totals 100% by weight of the monomer mixture. An acrylonitrile to styrene ratio in the monomer mixture of from about 20:80 to 80:20 can be used. A mixture of acrylonitrile to styrene having a weight ratio of from about 30:70 to about 70:30 can also be used.

The free radical polymerization initiators suitable for use as component (c) in the suitable preformed stabilizers (3) of the present invention encompass any free radical catalyst suitable for grafting of an ethylenically unsaturated polymer to a polyether containing compound, such as polyether polyol. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxyisobutyrate, t-butyl peroxy 3,5,5-trimethyl hexanoate, t-butyl perbenzoate, t-butyl peroxypivalate, t-amyl peroxypivalate, t-butyl peroxy-2-ethylhexanoate, lauroyl peroxide, cumene hydroperoxide, t-butyl hydroperoxide, azobis(isobutyronitrile), 2,2'-azo bis-(2-methylbutyronitrile), etc.

Useful catalysts also include, for example, those catalysts having a satisfactory half-life within the temperature ranges used to form the preformed stabilizer, i.e. the half-life should be about 25 percent or less of the residence time in the reactor at a given temperature. Representative examples of useful catalyst species include t-butyl peroxy-2-ethylhexanoate, t-butylperoxypivalate, t-amyl peroxypivalate, 2,5-dimethyl-hexane-2,5-di-per-2-ethyl hexanoate, t-butylperneodecanoate, and t-butylperbenzoate. Useful also are the azo catalysts such as azobisisobutyronitrile, 2,2'-azo bis-(2-methylbutyronitrile), and mixtures thereof. The preferred free radical catalysts are peroxides such as tertiary butylperoxy-2-ethylhexanoate.

Suitable catalysts concentrations range from at least about 0.01%, or at least about 0.02%, or at least from about 0.03% by weight. Suitable catalyst concentrations may range up to less than or equal to about 2%, or to less or equal to about 1%, or to less than or equal to about 0.3% by weight. The catalysts concentrations may vary between any combination of these upper and lower limits, inclusive, of at least about 0.01 to less than or equal to about 2% by weight, or from at least about 0.02 to less than or equal to about 1% by weight, or from at least about 0.03 to less than or equal to about 0.3% by weight, based on the total weight of the components (i.e. 100% by weight of the combined weight of the macromer, the ethylenically unsaturated monomer, the free-radical polymerization initiator and, the polymer control agent, and optionally, the liquid diluent). Up to a certain point, increases in the catalyst concentration result in increased monomer conversion and grafting; but further increases do not substantially increase conversion. Catalyst concentrations which are too high can cause cross-linking in the preformed stabilizer (3). The particular catalyst concentration selected will usually be an optimum value considering all factors, including costs.

In accordance with the present invention, components (a), (b), and (c) of the pre-formed stabilizer are soluble in (d) the polymer control agent. However, the resultant preformed stabilizer (3) is essentially insoluble in (d) the polymer control agent. This component may be one polymer control agent or a mixture of polymer control agents. Suitable compounds to be used as polymer control agents in accordance with the present invention include various mono-ols (i.e. monohydroxy alcohols), aromatic hydrocarbons, ethers, and other liquids, such as those described in, for example, U.S. Pat. Nos. 3,953,393, 4,119,586, 4,463,107, 5,324,774, 5,814,699 and 6,624,209, the disclosures of which are herein incorporated by reference. As long as the compound used as the polymer control agent does not adversely affect the performance of the preformed stabilizer (3), it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. However, it should not form two phases under the reaction conditions and it should be readily stripped from the final polymer/polyol.

The selection of mono-ol is typically an alcohol containing at least one carbon atom, such as methanol, ethanol, n-propanol, isopropanol, n-butanol, sec.-butanol, t-butanol, n-pentanol, 2-pentanol, 3-pentanol, and the like, and mixtures of the same. In one embodiment, the polymer control agent is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents (d) can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of preformed stabilizer (3)). The amount of crude polymer control agent in the total polymer control agent can range anywhere from 0% up to 100% by weight.

Suitable compounds to be used as component (e) the diluent of the preformed stabilizers of the present invention include typically the alkylene oxide adduct of $A(OH)_{>3}$ described above and/or the mono-ols described as suitable for component (d). Though the polyol used as component (5) can encompass the variety of polyols described above, including the broader class of polyols described in U.S. Pat. No. 4,242,249, at column 7, line 39 through column 9, line 10, the disclosure of which is herein incorporated by reference. It is preferred that the polyol component (5) is the same as or equivalent to the polyol used in the formation of precursor used to prepare the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (3), is as follows:

| Component of Formulation | Amount, weight % |
| --- | --- |
| (a) | from about 10 to about 40, or from about 15 to about 35; |
| (b) | from about 10 to about 30, or from about 15 to about 25; |
| (c) | from about 0.01 to about 2, or from about 0.1 to about 1; |
| (d) | from about 30 to about 80, or about from 40 to about 70; |
| (e) | from about 0 to about 20, or from about 0.5 to about 10. |

In the formulations proposed above for the preformed stabilizer (3), the %'s by weight of components (a), (b), (c) and (d), and optionally (e), totals 100% by weight of component (3), the preformed stabilizer.

The process for producing the preformed stabilizer (3) is similar to the process for making the polymer polyol. The temperature range is not critical and may vary from at least about 80° C. or higher, or from at least about 110° C. or higher. The temperature range may also vary up to no more than about 150° C., or up to no more than about 130° C. The temperature range may vary between any combination of these upper and lower values, inclusive, from at least about 80° C. to about 150° C., or from at least about 110° C. to no more than about 130° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

Suitable free-radical initiators to be used as component (4) in the present invention include, for example, those as described previously for the formation of the preformed stabilizers. Examples of suitable free-radical polymerization initiators for the present invention include initiators such as, for example, peroxides including both alkyl and aryl hydroperoxides, persulfates, peresters, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxypivalate, t-amyl peroxypivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, peroxyesters such as t-butyl peroxy-2-ethylhexanoate, t-butylperoxypivalate, t-amyl peroxypivalate, t-amyl peroctoate, 2,5-dimethyl-hexane-2,5-di-per-2-ethyl hexanoate, t-butyl perneodecanoate, t-butylperbenzoate and 1,1-dimethyl-3-hydroxybutyl peroxy-2-ethylhexanoate, and azo catalysts such as azobis (isobutyronitrile), 2,2'-azo bis-(2-methoxyl-butyronitrile), and mixtures thereof. Most preferred are the peroxyesters described above and the azo catalysts.

Particularly preferred in the practice of the invention, are the use of the aforementioned peroxyesters of the above formula. The preferred peroxyesters include those which have the unique advantage of affecting the desired degree of polymerization essentially without raising the viscosity of the polymer polyol over that obtained with the azo catalyst. This enhances one's ability to achieve higher solids polymer polyols with good product stability without raising product viscosity. Such peroxyesters can be used in molar amounts substantially less than the amounts required when using other free radical catalysts in forming the polymer polyols.

The suitable peroxides can be used in essentially pure form, or may be diluted to lower concentration using an appropriate diluent. Suitable diluents may be any compound known to be compatible with peroxides, such as aliphatic or aromatic hydrocarbons, mono-ols, polyether polyols, etc. The peroxide concentration in the solution is not critical, and may range from at least about 20 wt. % to about 80 wt. % or less. Storage and usage/feed line temperatures for the initiators can vary, and will depend upon the requirements for a particular initiator. But in general, storage/usage/feed line temperatures will be between −25° C. and 30° C.

The quantity of free-radical initiator used herein is not critical and can be varied within wide limits. In general, the amount of initiator ranges from at least about 0.01 to no more than about 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

The free-radical initiator may be added to the process using any known method. For instance, the initiator may be premixed with polyol component (1) in the polyol feed tank prior to entering the polymer polyol reactor. Additionally, initiator may be premixed by addition to the polyol (1) or preformed stabilizer (3) feed lines. A third option is for an independent initiator feed stream entering the process at the identical point as other component streams (1), (2), (3), (5) or immediately thereafter prior to entering the polymer polyol reactor. The process for carrying out the third option can vary. For instance, the initiator feed vessel can transport material to a header system capable of feeding initiator to single and/or multiple reactors simultaneously. Another aspect is to feed initiator to single and/or multiple reactors via a recirculation line from the initiator feed vessel. Said recirculation line carries initiator from and back to the initiator feed vessel, with independent initiator feed lines directed from the recirculation line to each polymer polyol reactor.

In addition, the polymer polyol and the process of preparing the polymer polyol may optionally comprise (5) a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is used in an amount of at least about 0.1, or of at least about 0.2% by weight, based on the total weight of the polymer polyol (prior to stripping).

The chain transfer agent is used in an amount of no more than about 2% by weight, or of no more than about 1% by weight, based on the total weight of the polymer polyol (prior to stripping). The amount of chain transfer agent may vary between any combination of these upper and lower values, inclusive, of at least about 0.1% to no more than about 2 wt. %, or at least about 0.2% to no more than about 1 wt. %, based on the total weight of the polymer polyol (prior to stripping).

The polymer polyols from the present invention can be made using any process (including continuous and semi-batch) and reactor configuration that is known to be suitable to prepare polymer polyols, such as, for example, a two-stage reaction system comprising a continuously-stirred tank reactor (CSTR) fitted with innpeller(s) and baffles (first-stage) and a plug-flow reactor (second stage). A typical reaction system may be equipped with any combination of jacket/half-coil, internal coil/tubes or external loop/cooler to remove the heat of reaction. Furthermore, the reaction system can utilize a wide range of mixing conditions. The reaction system may be characterized by energy inputs of from at least about 0.5, or from at least about 2 horsepower. The reaction system may also be characterized by energy inputs of no more than about 350, or of no more than about 50 horsepower. The energy inputs may vary between any combination of these upper and lower values, inclusive, of at least about 0.5 to no more than about 350 horsepower per 1000 gallons, or of at least about 2 to no more than about 50 horsepower per 1000 gallons on average for the bulk phase volume of each reactor as a particularly useful mixing power input. Mixing can be provided by any combination of impeller(s) and pump-around loop/jet mixing. It will be appreciated by one of ordinary skill in the art that the optimum energy input will most likely vary with the dispersion stability and the molecular weight of the base polyether polyol, e.g., a greater amount of energy is preferred for products with higher viscosities. In addition, polymer polyols of the present invention can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare polymer polyols including those described in the present invention, a residence time ranging from about 20 to about 180 minutes for the first reactor may be particularly useful. It is understood that for a multistage reactor system, total residence time is additive based on number of reactors. The reactants are pumped from feed tanks through an in-line static mixer, and then, through a feed tube into the reactor. It may be particularly useful to prepare a premix of the initiator with part of the polyol stream, as well as of polyol and stabilizer.

In general, reactant feed stream temperatures are ambient (i.e. 25° C.). However, if desired, feed streams can be heated to ≥25° C. prior to mixing and entering the reactor. Other process conditions, which may be useful, include cooling of the feed tube in the reactor. Furthermore, the suitable reaction conditions for polymer polyols in general as well as the specific products of the present invention mixture are characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling. In the present case, the wt.-% total polymer in the product was calculated from the concentrations of monomers measured in the crude polymer polyol before stripping.

In accordance with the present invention, the polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The temperature range is not critical and may vary. The temperature may be at least about 80° C., or at least about 90° C., or at least about 110° C. The temperature may also be about 200° C. or less, or about 150° C. or less, or about 130° C. or less. Suitable temperatures for the invention may range between any combination of the upper and lower values, inclusive, of from about 80° C. to about 200° C. or perhaps greater, of from about 90° C. to about 150° C., of from 110° C. to 130° C. As has been noted herein, the catalyst and temperature should be selected such that the catalyst has a reasonable rate of decomposition with respect to the hold-up time in the reactor for a continuous flow reactor or the feed time for a semi-batch reactor.

A suitable continuous process for making polymer polyols comprises (1) providing a heterogeneous mixture of the preformed stabilizer and, optionally, a chain transfer agent, in combination with a base polyol, a free radically polymerizable ethylenically unsaturated monomer, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated monomer to form a heterogeneous mixture containing the enhanced polymer polyol, unreacted monomers and chain transfer agent, and stripping the unreacted monomers and diluent from the enhanced polymer polyol to recover the unreacted monomers and diluent. This continuous process allows the manufacture of high solids, white polymer polyols with lower viscosities and good stability. This product has excellent product stability and requires less free radical catalyst in the production process. Other pertinent details for the continuous process of preparing polymer polyols can be found in, for example, U.S. Pat. No. 5,196,476, the disclosure of which is herein incorporated by reference.

The mixing conditions employed in the reaction zone are similar to those previously disclosed for component (3) a preformed stabilizer. The actual conditions may vary depending on the optimum conditions for a particular polymer polyol.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular those from the PCA and residues of monomers are generally stripped from the product by the usual method of vacuum distillation, optionally in a thin layer of a falling film evaporator. The monomer-free product may be used as is, or may be filtered to remove any large particles that may have been created.

Suitable chain extenders and/or crosslinking agents to be used as component (C) in accordance with the invention include, for example, lower molecular weight isocyanate-reactive components which may have functionalities of about 2 to about 3, and molecular weights of about 300 g/mole or less. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc., and mixtures thereof, and alkylene oxide adducts thereof. Some examples of suitable crosslinking agents include glycerol, trimethylolpropane, sorbitol, pentaerythritol, ethanolamine, diethanolamine, triethanolamine, etc., mixtures thereof, and alkylene oxide adducts thereof. It is also possible to use a polyether polyol that contains a high ethylene oxide content.

In accordance with the invention, the chain extenders and/or crosslinking agents may be present in an amount of from about 0.1 to about 5% by weight based on 100% by weight of the isocyanate-reactive component (II). Suitable amounts for the chain extenders and crosslinking agents in the present invention are from at least about 0.1%, or from at least about 0.5% by weight, based on 100% by weight of the isocyanate-reactive component (II). Suitable amounts for the chain extenders and crosslinking agents in the present invention are about 5% or less, or about 3% by weight, based on 100% by weight of the isocyanate-reactive component (II). The chain extenders and crosslinking agents may be used in the present invention in amounts ranging between any combination of these upper and lower values, inclusive, such as, from at least about 0.1% to about 5% by weight or less, or from at least about 0.5% to about 3% by weight or less, based on 100% by weight of the isocyanate-reactive component (II).

Suitable (III) blowing agents for the present invention include, for example chemical blowing agents and/or physical blowing agents. Some examples of the suitable blowing agents for the present invention include but are not limited to compounds such as, for example, water, carbon dioxide, methylene chloride, acetone, fluorocarbons, chlorofluorocarbons, hydrochlorofluorocarbons, highly fluorinated and/or perfluorinated hydrocarbons, chlorinated hydrocarbons, and low boiling hydrocarbons such as propane, butane, pentane, hexane, etc., etc. Some examples of suitable hydrochlorofluorocarbons include compounds such as 1,1-dichloro-1-fluoroethane (HCFC-141b), 1-chloro-1,1-difluoroethane (HCFC-142b), and chlorodifluoromethane (HCFC-22); of suitable hydrofluorocarbons include compounds such as 1,1,1,3,3-pentafluoropropane (HFC-245fa), 1,1,1,2-tetrafluoroethane (HFC-134a), 1,1,1,3,3,3-hexafluoro-propane (HFC-236fa), 1,1,2,3,3,3-hexafluoropropane (HFC-236ea), and 1,1,1,4,4,4-hexafluorobutane (HFC-356mffm); of suitable perfluorinated hydrocarbons include compounds such as perfluoropentane or perfluorohexane; and of suitable hydrocarbons include compounds such as various isomers of butane, pentane, cyclopentane, hexane, or mixtures of thereof.

In one embodiment, the blowing agent comprises water and/or carbon dioxide. Water can be used as the sole blowing agent in accordance with the invention.

It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein, In addition, water may be used as the sole blowing agent.

The amount of blowing agent or blowing agent mixture used in accordance with the invention ranges from about 0.5 to about 20%, based on 100% by weight of isocyanate-reactive component (II). Suitable blowing agents may be used in amounts of from at least about 0.5%, or from at least about 0.6%, or from at least about 0.75% by weight, based on 100% by weight of isocyanate-reactive component (II). Suitable blowing agents may also be present in amounts of about 20% or less, or of about 10% or less, or of about 7% by weight or less, based on 100% by weight of the isocyanate-reactive component (II). The amount of blowing agent present may vary between any combination of these upper and lower ranges, inclusive, such as from about 0.5% to about 20%, or from about 0.6% to about 10%, or from about 0.75% to about 7% by weight, based on 100% by weight of isocyanate-reactive component (II).

In the embodiment where water is used as the blowing agent, the amount of water present ranges from about 0.5 to about 10% by weight, based on 100% by weight of isocyanate-reactive component (II). The amount of water used as a blowing agent may be at least about 0.5%, or at least about 0.75% by weight, The amount of water used as a blowing agent may also be about 10% by weight or less, or about 7% by weight or less, based on 100% by weight of isocyanate-reactive component (II). When water is used as the blowing agent, the amount of water may vary between any combination of these upper and lower values, inclusive, such as from at least about 0.5% to about 10% or less, or from at least about 0.75% to 7% by weight or less, based on 100% by weight of the isocyanate-reactive component (II). The addition of water can be effected in combination with the use of the other blowing agents described.

In accordance with the present invention, other additives and auxiliary agents that may be present in the foams include, for example, catalysts, surfactants, flame retardants, dyes, pigments, antioxidants, liquid and solid fillers and other known commercial additives. Such commercial additives are included in the foams in conventional amounts when used.

The foam may be produced in the presence of a surfactant. Surfactants help to stabilize the foam until it cures. Suitable surfactants are those well known in the polyurethane industry. Suitable surfactants for the invention include, for example, polysiloxanes, polyether siloxanes, including those which are insoluble or have low solubility in water.

Compounds such as these are generally of such a structure that copolymers of ethylene oxide and propylene oxide are attached to a polydimethylsiloxane residue. Surfactants which act as foam stabilizers such as these are disclosed in U.S. Pat. Nos. 2,834,748, 2,917,480 and 3,629,308, the disclosures of which are hereby incorporated by reference. Other surface active agents including non-silicone types may also be employed in the invention.

A wide variety of organosilicone surfactants are commercially available and are suitable for the invention. Some examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 5 parts per 100 parts of isocyanate-reactive component (II). The surfactant may be present in an amount of at least about 0.1 or of at least about 0.2 parts per 100 parts of isocyanate-reactive (component (II). The surfactant may also be present in an amount of about 5 parts or less, or about 3 parts or less, per 100 parts of isocyanate-reactive component (II). In addition, the amount of surfactant may range between any combination of these upper and lower values, inclusive, such as from about 0.1 to about 5 parts, or from about 0.2 to about 3 parts per 100 parts of isocyanate-reactive component (II).

The foams herein may be prepared in the presence of one or more polyurethane catalyst. A number of suitable polyurethane catalysts for the invention are described in U.S. Pat. No. 5,011,908, the disclosure of which is herein incorporated by reference.

Catalysts suitable for the polyurethane foam of the present invention include, for example, amine compounds and organometallic compounds. Suitable examples of such catalysts include tertiary amines, such as trimethylamine, triethylamine, tributylamine, N-methylmorpholine, N-ethylmorpholine, N,N,N',N'-tetramethylethylenediamine, pentamethyldiethylenetriamine and higher homologues (as described in, for example, U.S. Pat. No. 4,143,003 and in GB 1530225, the disclosures of which are herein incorporated by reference), N,N-ethylmorpholine, N,N-dimethylethanolamine, pentamethyldipropylenetriamine, triethanolamine, triethylenediamine, pyridine oxide, 1,4-diazabicyclo(2.2.2)octane, N-methyl-N'-dimethyl-aminoethylpiperazine, bis-(dimethylaminoalkyl)piperazines, N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-p-phenylethylamine, 1,2-dimethyl-imidazole, 2-methylimidazole, monocyclic and bicyclic amines together with bis-(dialkylamino)alkyl ethers, such as 2,2-bis-(dimethylaminoethyl) ether.

Other suitable catalysts which may be used in producing the polyurethane foams herein include, for example, organometallic compounds, and particularly, organotin compounds. Among the suitable organotin compounds are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibuytyltindilauryl-mercaptide, dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like.

Other suitable organotin compounds which may be used include those organotin compounds containing sulfur. Such catalysts include, for example, di-n-octyltinmercaptide. Other types of suitable organotin catalysts include, preferably tin(II) salts of carboxylic acids such as, for example, tin(II) acetate, tin(II) octoate, tin(II) oleate, tin(II) ethylhexanoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

It is also possible to use a combination of an organoamine catalyst and an organotin catalyst in the polyurethanes of the invention. Suitable polyurethane catalysts include those amine catalysts and tin catalysts as described above. In accordance with the invention, the polyurethane catalysts can be used in an amount within the range of about 0.001 to about 5 parts per 100 parts of isocyanate-reactive component (II). The polyurethane catalyst can be used in an amount of at least about 0.001, or at least about 0.05, or at least about 0.1 parts per 100 parts of isocyanate-reactive component (II). The catalysts can also be used in an amount of about 5 parts or less, or about 3 parts or less, or about 2 parts or less. The polyurethane catalysts can be used in any amount ranging between any combination of these upper and lower values, inclusive, such as from about 0.001 to about 5 parts or less, or from about 0.05 to about 3 parts or less, or from about 0.1 to about 2 parts or less, per 100 parts of isocyanate-reactive component (II).

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from about 90 to about 120. The term "isocyanate index", which may also be referred to as the NCO index, is defined herein as the ratio of reactive isocyanate groups (equivalents) to active hydrogen groups (equivalents), multiplied by 100%.

Another approach suitable for the invention is the prepolymer approach to making the foams. In this approach, a significant portion of the isocyanate-reactive mixture is reacted with the polyisocyanate, and the resulting prepolymer is then reacted with the remaining components.

Certain embodiments of the present invention, therefore, are directed to a process for producing a flexible polyurethane foam, comprising reacting (I) at least one diisocyanate or polyisocyanate component, with (II) an isocyanate-reactive component comprising (A) at least polyether polyol having a functionality of from about 2 to about 6 and a molecular weight of from about 700 to about 14,000; (B) at least one polymer polyol having a solids content of greater than about 20% by weight, a total ethylene oxide content of up to about 25% by weight, having a viscosity at 25° C. of less than about 15,000 mPa·s, and comprising a reaction product of (1) at least one base polyol containing active hydrogen atoms having a molecular weight of less than about 14,000 and a total ethylene oxide content up to about 40% by weight, said base polyol being formed in the presence of a DMC catalyst, (2) at least one unsaturated monomer, and, (3) a preformed stabilizer, in the presence of; (4) at least one free radical initiator that comprises a peroxide, and optionally (5) a chain transfer agent; and (C) one or more chain extenders and/or crosslinking agents having a functionality of from about 2 to about 3, and a molecular weight of from about 300 or less; in the presence of (III) one or more blowing agents, and, optionally, (IV) one or more additives and/or auxiliary agents; at an Isocyanate Index of from about 90 to about 120.

In certain embodiments, the invention is directed to the process of preparing a flexible polyurethane foam of the previous paragraph wherein (I) said diisocyanate component comprises at least one of toluene diisocyanate, diphenylmethane diisocyanate, and polymethylene polyphenylisocyanate.

In certain embodiments, the invention is directed to the process of preparing a flexible polyurethane foam of the previous two paragraphs wherein (II) said isocyanate-reactive component comprises: at least one polyether polyol having a functionality of from about 3 to about 5, and a molecular weight of about 1000 to about 12,000; and at least one polymer polyol having a solids content of at least about 30% to about 60% by weight or less, a total ethylene oxide content of at least about 2% to about 23% or less, and a viscosity at 25° C. of about 14,000 mPa·s or less.

In certain embodiments, the invention is directed to the process of preparing a flexible polyurethane foam of the previous three paragraphs wherein (II)(B)(1) said base polyol has a functionality of about 2 to about 8, an OH number of from at least about 8 to about 640 or less, and a total ethylene oxide content of from about 2% to about 35% by weight.

In certain embodiments, the invention is directed to the process of preparing a flexible polyurethane foam of the previous four paragraphs wherein (II)(B)(1) said base polyol is prepared via a semi-batch process in which an alkylene oxide is continuously added to the reactor during production of the DMC-catalyzed polyol.

In certain embodiments, the invention is directed to the process of preparing a flexible polyurethane foam of the previous five paragraphs wherein (II)(B)((2) said at least one unsaturated monomer comprises a mixture of styrene and acrylonitrile.

In certain embodiments, the invention is directed to the process of preparing a flexible polyurethane foam of the previous six paragraphs wherein styrene and acrylonitrile are present in a weight ratio of from about 80:20 to about 20:80.

In certain embodiments, the invention is directed to the process of preparing a flexible polyurethane foam of the previous seven paragraphs wherein (II)(3)(4) said free radical initiator is chosen from t-butyl peroxy-2-ethylhexanoate, t-butylperoxypivalate, t-amyl peroxypivalate, 2,5-dimethylhexane-2,5-di-per-2-ethyl hexanoate, t-butylperneodecanoate, and t-butylperbenzoate.

In certain embodiments, the invention is directed to the process of preparing a flexible polyurethane foam of the previous eight paragraphs wherein (C) is present in an amount of from about 0.1 to about 5% by weight, based on 100% by weight of the isocyanate-reactive component (II), and is chosen from ethylene glycol, propanediol, butanediol, hexanediol, 2-methyl-1,3-propanediol, diethylene glycol, triethylene glycol, dipropylene glycol, tripropylene glycol, glycerol, trimethylolpropane, sorbitol, pentaerythritol, ethanolamine, diethanolamine, triethanolamine, alkylene oxides adducts thereof, and mixtures thereof.

In certain embodiments, the invention is directed to the process of preparing a flexible polyurethane foam of the previous nine paragraphs wherein said reaction occurs in the presence of (IV) one or more additives selected from the group consisting of catalysts, surfactants, flame retardants, dyes, pigments, fillers and mixtures thereof.

In certain embodiments, the invention is directed to the process of preparing a flexible polyurethane foam of the previous ten paragraphs wherein said blowing agent comprises water.

Certain embodiments of the present invention, therefore, are directed to a flexible polyurethane foam comprising the reaction product of: (I) at least one diisocyanate or polyisocyanate component, with (II) an isocyanate-reactive component comprising (A) at least polyether polyol having a functionality of from about 2 to about 6 and a molecular weight of from about 700 to about 14,000; (B) at least one polymer polyol having a solids content of greater than about 20% by weight, a total ethylene oxide content of up to about 25% by weight, having a viscosity at 25° C. of less than about 15,000 mPa·s, and comprising a reaction product of (1) at least one base polyol containing active hydrogen atoms having a molecular weight of less than about 14,000 and a total ethylene oxide content up to about 40% by weight, said base polyol being formed in the presence of a DMC catalyst, (2) at least one unsaturated monomer, and, (3) a preformed stabilizer, in the presence of; (4) at least one free radical initiator that comprises a peroxide, and optionally (5) a chain transfer agent; and (C) one or more chain extenders and/or crosslinking agents having a functionality of from about 2 to about 3, and a molecular weight of from about 300 or less; in the presence of (III) one or more blowing agents, and, optionally, (IV) one or more additives and/or auxiliary agents; at an Isocyanate Index of from about 90 to about 120.

In certain embodiments, the invention is directed to the flexible polyurethane foam of the previous paragraph wherein (I) said diisocyanate component comprises at least one of toluene diisocyanate, diphenylmethane diisocyanate, and polymethylene polyphenylisocyanate.

In certain embodiments, the invention is directed to the flexible polyurethane foam of the previous two paragraphs wherein (II) said isocyanate-reactive component comprises: at least one polyether polyol having a functionality of from about 3 to about 5, and a molecular weight of about 1000 to about 12,000; and at least one polymer polyol having a solids content of at least about 30% to about 60% by weight or less, a total ethylene oxide content of at least about 2% to about 23% or less, and a viscosity at 25° C. of about 14,000 mPa·s or less.

In certain embodiments, the invention is directed to flexible polyurethane foam of the previous three paragraphs wherein (II)(B)(1) said base polyol has a functionality of about 2 to about 8, an OH number of from at least about 8 to about 640 or less, and a total ethylene oxide content of from about 2% to about 35% by weight.

In certain embodiments, the invention is directed to flexible polyurethane foam of the previous four paragraphs wherein (II)(B)(1) said base polyol is prepared via a semi-batch process in which an alkylene oxide is continuously added to the reactor during production of the DMC-catalyzed polyol.

In certain embodiments, the invention is directed to the flexible polyurethane foam of the previous five paragraphs wherein (II)(B)((2) said at least one unsaturated monomer comprises a mixture of styrene and acrylonitrile.

In certain embodiments, the invention is directed to the flexible polyurethane foam of the previous six paragraphs wherein styrene and acrylonitrile are present in a weight ratio of from about 80:20 to about 20:80.

In certain embodiments, the invention is directed to the flexible polyurethane foam of the previous seven paragraphs wherein (11)(6)(4) said free radical initiator is chosen from t-butyl peroxy-2-ethyl-hexanoate, t-butylperoxypivalate, t-amyl peroxypivalate, 2,5-dimethylhexane-2,5-di-per-2-ethyl hexanoate, t-butylperneodecanoate, and t-butylperbenzoate.

In certain embodiments, the invention is directed to the flexible polyurethane foam of the previous eight paragraphs wherein (C) is present in an amount of from about 0.1 to about 5% by weight, based on 100% by weight of the isocyanate-reactive component (II), and is chosen from ethylene glycol, propanediol, butanediol, hexanediol, 2-methyl-1,3-propanediol, diethylene glycol, triethylene glycol, dipropylene glycol, tripropylene glycol, glycerol, trimethylolpropane, sorbitol, pentaerythritol, ethanolamine, diethanolamine, triethanolamine, alkylene oxides adducts thereof, and mixtures thereof.

In certain embodiments, the invention is directed to a flexible polyurethane foam of the previous nine paragraphs wherein said reaction occurs in the presence of (IV) one or more additives selected from the group consisting of catalysts, surfactants, flame retardants, dyes, pigments, fillers and mixtures thereof.

In certain embodiments, the invention is directed to the flexible polyurethane foam of the previous ten paragraphs wherein said blowing agent comprises water.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples.
STARTER A: A propylene oxide adduct of glycerine with a hydroxyl number of about 238 inhibited with antioxidant (500 ppm BHT or equivalent) and acidified with 10 ppm phosphoric acid.
STARTER B: A propylene oxide adduct of propylene glycol with a hydroxyl number of about 264 inhibited with antioxidant (500 ppm BHT or equivalent) and acidified with 10 ppm phosphoric acid.
CATALYST A: a double metal cyanide catalyst available from Covestro LLC as Arcol Catalyst 3.
STY: Styrene monomer
ACN: Acrylonitrile monomer
INITIATOR A: 2,2'-Azo-bis-isobutyronitrile, a free-radical polymerization initiator commercially available under the name VAZO 64 from E. I. DuPont de Nemours and Co.
INITIATOR B: tertiary-Amylperoxypivalate, a free-radical polymerization initiator commercially available under the name Trigonox 125-C75 from AkzoNobel.
POLYOL A: A propylene oxide adduct of sorbitol containing 16% ethylene oxide with a hydroxyl number of 28
POLYOL B: An ethylene oxide adduct of glycerin with a hydroxyl number of 168 commercially available as TPEG 990 from Dow Chemical.
DEOA-LF: Diethanolamine, a commercially available foam crosslinker/foam modifier that is commercially available from Air Products.
Niax U-2000: A silicone surfactant commercially available from Momentive Performance Materials.
Dabco T-9: A tin catalyst (stannous octoate) available from Air Products.
NIAX A-1: Amine catalyst which is commercially available from Momentive Performance Materials under the name NIAX A-1.
TMI: Isopropenyl dimethylbenzyl isocyanate (an unsaturated aliphatic isocyanate) sold as TMI by Allnex.
TDI: Toluene diisocyanate containing approximately 80% by weight of the 2,4-isomer and about 20% by weight of the 2,6-isomer.
VISCOSITY: Viscosities were measured by an Anton Paar SVM3000 viscometer (mPa·s at 25° C.).
FILTERABILITY: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material in relation to a fixed cross-sectional area of screen (e.g. 1⅛ in. diameter), such that all of the polymer polyol and isopropanol solutions passes by gravity through a 700-mesh screen. The 700-mesh screen is made with a Dutch twill weave. The actual screen used had a nominal opening of 30 microns. The amount of sample which passed through the screen within 600 seconds was reported in percent, and a value of 100 percent indicates that over 99 weight percent passed through the screen.

Examples 1-3

Polyether Polyol Preparation

Starter A and Starter B (5031 g, 83/17) were charged to a 30 L stainless steel reactor along with 0.69 g double metal cyanide catalyst prepared according to the procedure disclosed in U.S. Pat. No. 5,482,908. This mixture was heated to 130° C. with nitrogen stripping of the polyol/catalyst blend. Propylene oxide (214 g) and ethylene oxide (38 g) were charged to activate the catalyst. After activation, the reactor was maintained at 130° C. and propylene oxide (14996 g) and ethylene oxide (2722 g) were added over a 3 hour period. After digestion at 130° C. for 0.5 hours, the polyether was stripped to remove any unreacted propylene oxide or ethylene oxide, inhibited with 500 ppm BHT or equivalent, cooled, and discharged (Example 2).

TABLE 1

|  | EXAMPLE 1 | EXAMPLE 2 | EXAMPLE 3 |
| --- | --- | --- | --- |
| Starter, A/B | 83/17 | 83/17 | 83/17 |
| OH# | 57.2 | 52.3 | 47.0 |
| Viscosity, mPa·s | 438 | 497 | 509 |

TABLE 1-continued

|  | EXAMPLE 1 | EXAMPLE 2 | EXAMPLE 3 |
|---|---|---|---|
| % EO | 12 | 12 | 12 |
| Polyol | C | D | E |

Preformed Stabilizer A:
Polyol F: A sorbitol-started polyether polyol produced by reacting propylene oxide and 8% ethylene oxide in the presence of potassium hydroxide catalyst and refining to remove the catalyst. The polyol has a hydroxyl number of 28.
Macromer A: Prepared by heating Polyol F (100 parts), TMI (2 parts), and 100 ppm bismuth neodecanoate catalyst at 75° C. for 2 hours.
Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±1° C. The product from the second-stage reactor overflowed continuously through a pressure regulator designed to control the pressure in each stage at 65 psig. The pre-formed stabilizer then passed through a cooler and into a collection vessel. The preformed stabilizer formulations are disclosed in Table 2.

TABLE 2

| Preformed Stabilizer A: | |
|---|---|
| Preformed Stabilizer | PFS A |
| PCA Type | Isopropanol |
| PCA concentration in feed, Wt. % | 60.0% |
| Macromer | Macromer A |
| Macromer concentration in feed, Wt. % | 24.0% |
| Monomers concentration in feed, Wt. % | 15.9% |
| Styrene/Acrylonitrile ratio in feed, Wt. % | 50:50 |
| TBPEH* concentration, Wt. % | 0.1% |

*tertiary-butylperoxy-2-ethylhexanoate

In the above table, the wt. % concentrations are based on 100% by wt. of the total feed.

Examples 4-9

Polymer Polyol Preparation

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The feed consumption is reported in TABLE 3.

The temperature of the reaction mixture was controlled at 115±5° C. The product from the second-stage reactor overflowed continuously through a pressure regulator designed to control the pressure in each stage at 45 psig. The polymer polyol then passed through a cooler and into a collection vessel. The run time for production of each of the polymer polyols was approximately 19 hours.

The crude product was vacuum stripped to remove volatiles. The wt. % total polymer in the product was calculated from the concentrations of monomers measured in the crude polymer polyol before stripping. Representative processing conditions used to produce all PMPO examples are shown using Example 4 in Table 3. Product differences are illustrated in Table 4.

TABLE 3

|  | EXAMPLE 4 |
|---|---|
| POLYOL | C |
| POLYOL, wt. % | 46.10 |
| PFS A, wt. % | 5.50 |
| INITIATOR, (wt. %) | A (0.25) |
| STY, wt. % | 31.34 |
| ACN, wt. % | 16.81 |
| 700-Mesh Filtration | 100% |

TABLE 4

| Polymer Polyols 4-9 | | | | | | |
|---|---|---|---|---|---|---|
| Example | 4 | 5 | 6 | 7 | 8 | 9 |
| Polyol | C | C | D | D | E | E |
| Initiator | A | B | A | B | A | B |
| % Solids* | 44.0 | 44.0 | 44.0 | 44.0 | 44.0 | 44.0 |

*All Examples were diluted to 44.0% solids prior to foam evaluation with the same base polyol used to produce each PMPO.

Examples 10-15

Foam Preparation

A free-rise foam was prepared with each of the polymer polyols produced in Examples 4-9. The general formulation for these foams was as follows:

TABLE 5

|  | Formulation |
|---|---|
| PMPO | 42.6 |
| Polyol A | 56.0 |
| Polyol B | 1.4 |
| WATER | 3.22 |
| DEOA-LF | 3.52 |
| Niax U-2000 | 0.5 |
| Niax A-1 | 0.1 |
| Dabco T-9 | 0.07 |
| TDI | 53.17 |
| NCO Index | 110 |

All the formulation ingredients except Dabco T-9 catalyst and the isocyanate component were added to a one-half gallon cylindrical container fitted with baffles. The contents were mixed at 2400 rpm for 60 seconds with an agitator having two turbine impellers. The mixture was then degassed for 15 seconds. Dabco T-9 catalyst was added at this time. After degassing, the contents were mixed at 2400 rpm for 15 seconds, during which period the isocyanate component was added with about 7 seconds of mixing remaining. The mixture was then poured into a 14×14×6-inch cardboard box, where it rose freely until the reaction was complete. A batch size sufficient to give a foam bun height of approximately 9 inches high was employed. The rise profile was measured by sonar, and the % foam settle reported in Table 6. A smaller % settle is indicative of a more stable foam.

TABLE 6

Foams Prepared from Polymer Polyols 4-9

| Example | 10 | 11 | 12 | 13 | 14 | 15 |
|---|---|---|---|---|---|---|
| PMPO | 4 | 5 | 6 | 7 | 8 | 9 |
| % Settle | 3.2 | 2.6 | 5.7 | 4.9 | 8.6 | 6.9 |

As can be seen from the examples in Table 6, the use of a peroxide initiator catalyst for the PMPO formation leads to a more stable foam as measured by % settle of the foam.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a flexible polyurethane foam, comprising reacting
    (I) at least one diisocyanate or polyisocyanate component which comprises at least one of toluene diisocyanate, diphenylmethane diisocyanate, and polymethylene polyphenylisocyanate,
    with
    (II) an isocyanate-reactive component comprising
        (A) at least polyether polyol having a functionality of from about 3 to about 6 and a molecular weight of from about 1000 to about 12,500;
        (B) at least one polymer polyol having a solids content of at least about 30% by weight to about 60% by weight, a total ethylene oxide content of at least about 2% to about 23% by weight, having a viscosity at 25° C. of less than about 14,000 mPa·s, and comprising a reaction product of
            (1) at least one base polyol containing active hydrogen atoms having a functionality of 2 to 6, a hydroxyl number of 30 to 200, and a total ethylene oxide content of about 8% to about 25% by weight, said base polyol being prepared via a semi-batch process in which a low molecular weight starter and a DMC catalyst are added to a reactor, and alkylene oxide is continuously added to the reactor over 2 or more hours to the target hydroxyl number of 30 to 200
            (2) at least one unsaturated monomer, and,
            (3) a preformed stabilizer,
            in the presence of;
            (4) at least one free radical initiator consisting essentially of t-amylperoxypivalate,
            and optionally
            (5) a chain transfer agent;
        and
        (C) one or more chain extenders and/or crosslinking agents having a functionality of from about 2 to about 3, and a molecular weight of from about 300 or less;
    in the presence of
    (III) one or more blowing agents,
    and, optionally,
    (IV) one or more additives and/or auxiliary agents;
    at an Isocyanate Index of from about 90 to about 120,
    wherein the low molecular weight starter used to prepare the base polyol comprises an alkylene oxide adduct of glycerin and an alkylene oxide adduct of propylene glycol and the continuously added alkylene oxide used to prepare the base polyol comprises ethylene oxide and propylene oxide.

2. The process of claim 1, wherein said low molecular weight starter in said semi-batch process is prepared via DMC catalysis or via KOH catalysis in which the KOH has been removed and has a hydroxyl number of 650 mg KOH/g to 112 mg KOH/g and 100 wt % of the low molecular weight starter is added to the reaction vessel before starting the alkylene oxide feed.

3. The process of claim 1, wherein (II)(B)((2) said at least one unsaturated monomer comprises a mixture of styrene and acrylonitrile.

4. The process of claim 3, wherein styrene and acrylonitrile are present in a weight ratio of from about 80:20 to about 20:80.

5. The process of claim 1, wherein (C) is present in an amount of from about 0.1 to about 5% by weight, based on 100% by weight of the isocyanate-reactive component (II), and is chosen from ethylene glycol, propanediol, butanediol, hexanediol, 2-methyl-1,3-propanediol, diethylene glycol, triethylene glycol, dipropylene glycol, tripropylene glycol, glycerol, trimethylolpropane, sorbitol, pentaerythritol, ethanolamine, diethanolamine, triethanolamine, alkylene oxides adducts thereof, and mixtures thereof.

6. A flexible polyurethane foam comprising the reaction product of:
    (I) at least one diisocyanate or polyisocyanate component which comprises at least one of toluene diisocyanate, diphenylmethane diisocyanate, and polymethylene polyphenylisocyanate,
    with
    (II) an isocyanate-reactive component comprising
        (A) at least polyether polyol having a functionality of from about 3 to about 5 and a molecular weight of from about 1000 to about 12,500;
        (B) at least one polymer polyol having a solids content of at least about 30% by weight to about 60% by weight, a total ethylene oxide content of at least about 2% to about 23% by weight, having a viscosity at 25° C. of less than about 14,000 mPa·s, and comprising a reaction product of
            (1) at least one base polyol containing active hydrogen atoms having a functionality of 2 to 6, a hydroxyl number of 30 to 200, and a total ethylene oxide content of about 8 to about 25% by weight, said base polyol being prepared via a semi-batch process in which a low molecular weight starter and a DMC catalyst are added to a reactor, and alkylene oxide is continuously added in a random distribution to the reactor over 2 or more hours to the target hydroxyl number of 30 to 200,
            (2) at least one unsaturated monomer, and,
            (3) a preformed stabilizer,
            in the presence of;
            (4) at least one free radical initiator consisting essentially of t-amylperoxypivalate,
            and optionally
            (5) a chain transfer agent;
        and (C) one or more chain extenders and/or crosslinking agents having a functionality of from about 2 to about 3, and a molecular weight of from about 300 or less;

in the presence of (III) one or more blowing agents, and, optionally, (IV) one or more additives and/or auxiliary agents;

at an Isocyanate Index of from about 90 to about 120, wherein the low molecular weight starter used to prepare the base polyol comprises an alkylene oxide adduct of glycerin and an alkylene oxide adduct of propylene glycol and the continuously added alkylene oxide used to prepare the base polyol comprises ethylene oxide and propylene oxide.

7. The flexible polyurethane foam of claim 6, wherein said low molecular weight starter in said semi-batch process is prepared via DMC catalysis or via KOH catalysis in which the KOH has been removed and has a hydroxyl number of 650 mg KOH/g to 112 mg KOH/g and 100 wt % of the low molecular weight starter is added to the reaction vessel before starting the alkylene oxide feed.

8. The flexible polyurethane foam of claim 6, wherein (II)(B)((2) said at least one unsaturated monomer comprises a mixture of styrene and acrylonitrile.

9. The flexible polyurethane foam of claim 8, wherein styrene and acrylonitrile are present in a weight ratio of from about 80:20 to about 20:80.

10. The flexible polyurethane foam of claim 6, wherein (C) is present in an amount of from about 0.1 to about 5% by weight, based on 100% by weight of the isocyanate-reactive component (II), and is chosen from ethylene glycol, propanediol, butanediol, hexanediol, 2-methyl-1,3-propanediol, diethylene glycol, triethylene glycol, dipropylene glycol, tripropylene glycol, glycerol, trimethylolpropane, sorbitol, pentaerythritol, ethanolamine, diethanolamine, triethanolamine, alkylene oxides adducts thereof, and mixtures thereof.

11. The process of claim 1, wherein (II)(B)(1) said base polyol has an OH number of 30 to 150 and a functionality of 2 to 4.

12. The process of claim 11, wherein (II)(B)(1) said base polyol has a functionality of 2 to 3.

13. The flexible polyurethane foam of claim 6, wherein (II)(B)(1) said base polyol has an OH number of 30 to 150 and a functionality of 2 to 4.

14. The flexible polyurethane foam of claim 13, wherein (II)(B)(1) said base polyol has a functionality of 2 to 3.

15. The process of claim 1, wherein the alkylene oxide adduct of glycerin is a propylene oxide adduct of glycerin and the alkylene oxide adduct of propylene glycol is a propylene oxide adduct of propylene glycol.

16. The flexible polyurethane foam of claim 6, wherein the alkylene oxide adduct of glycerin is a propylene oxide adduct of glycerin and the alkylene oxide adduct of propylene glycol is a propylene oxide adduct of propylene glycol.

* * * * *